US011700593B2

(12) United States Patent
Park et al.

(10) Patent No.: US 11,700,593 B2
(45) Date of Patent: Jul. 11, 2023

(54) FREQUENCY-SELECTIVE SINGLE FREQUENCY NETWORK BASED ON THE MODIFIED TYPE-II PORT SELECTION CODEBOOK

(71) Applicant: QUALCOMM Incorporated, San Diego, CA (US)

(72) Inventors: Sungwoo Park, Seoul (KR); Wooseok Nam, San Diego, CA (US); Tao Luo, San Diego, CA (US); Kiran Venugopal, Raritan, NJ (US); Tianyang Bai, Somerville, NJ (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/236,390

(22) Filed: Apr. 21, 2021

(65) Prior Publication Data

US 2021/0368477 A1      Nov. 25, 2021

Related U.S. Application Data

(60) Provisional application No. 63/029,291, filed on May 22, 2020.

(51) Int. Cl.
*H04W 72/02*          (2009.01)
*H04B 7/0456*         (2017.01)
              (Continued)

(52) U.S. Cl.
CPC .......... *H04W 72/02* (2013.01); *H04B 7/0482* (2013.01); *H04B 7/0626* (2013.01);
              (Continued)

(58) Field of Classification Search
CPC ............... H04W 72/02; H04W 56/001; H04W 72/0453; H04W 72/542; H04B 7/0482;
              (Continued)

(56) References Cited

U.S. PATENT DOCUMENTS

2018/0145737 A1 *  5/2018  Rahman ............... H04B 7/0634
2018/0323846 A1 * 11/2018  Tsai ..................... H04B 7/0617

FOREIGN PATENT DOCUMENTS

WO     WO-2017193934 A1     11/2017
WO     WO-2020052428 A1      3/2020

OTHER PUBLICATIONS

International Search Report and Written Opinion—PCT/US2021/028681—ISA/EPO—dated Jul. 14, 2021.
              (Continued)

*Primary Examiner* — Ayanah S George
(74) *Attorney, Agent, or Firm* — Norton Rose Fulbright US LLP; Dang M. Vo

(57) ABSTRACT

Frequency-selective single frequency network (SFN) operation is disclosed based on a modified Type-II port selection codebook. Within the channel state information (CSI) feedback procedure, a user equipment (UE) observing the CSI-reference signal (CSI-RS) resource configured by the serving base station with two ports configured over multiple sectors of the serving base station may select a precoder from the Type-II port selection codebook which accommodates additional subband amplitude information. The additional subband amplitude information may include a subband dynamic SFN activation indicator. In such a CSI report selected from the Type-II port selection codebook, the UE may indicate to the serving base station both a wideband SFN activation/deactivation and a subband SFN activation/deactivation in addition to the subband phase information. The serving base station may then use this CSI report to activate/deactivate SFN operations in both wideband and subband over each of the participating sectors.

23 Claims, 9 Drawing Sheets

(51) Int. Cl.
  *H04B 7/06* (2006.01)
  *H04W 56/00* (2009.01)
  *H04W 72/0453* (2023.01)
  *H04W 72/542* (2023.01)

(52) U.S. Cl.
  CPC ..... *H04W 56/001* (2013.01); *H04W 72/0453* (2013.01); *H04W 72/542* (2023.01)

(58) Field of Classification Search
  CPC .. H04B 7/0626; H04B 7/0621; H04B 7/0417; H04B 7/0495
  See application file for complete search history.

(56) References Cited

OTHER PUBLICATIONS

Sprespreadtrum Communications: "Discussion on Multi-TRP Transmission," 3GPP Draft, 3GPP TSG RAN WG1 #99, R1-1912562, 3rd Generation Partnership Project (3GPP), Mobile Competence Centre, 650, Route Des Lucioles, F-06921, Sophia-Antipolis Cedex, France, vol. RAN WG1. No. Reno, USA, Nov. 18, 2019-Nov. 22, 2019, Nov. 8, 2019 (Nov. 8, 2019), XP051820084, 10 pages, Retrieved from the Internet: URL: https://ftp.3gpp.org/tsg_ran/WG1_RL1/TSGR1_99/Docs/R1-1912562.zip R1-1912562 Discussion on Multi-TRP transmission.docx [retrieved on Nov. 8, 2019] the whole document.

\* cited by examiner

FREQUENCY-SELECTIVE SINGLE FREQUENCY NETWORK BASED ON THE MODIFIED TYPE-II PORT SELECTION CODEBOOK

CROSS-REFERENCE TO RELATED APPLICATIONS

This application claims the benefit of U.S. Provisional Patent Application No. 63/029,291, entitled, "FREQUENCY-SELECTIVE SINGLE FREQUENCY NETWORK BASED ON THE MODIFIED TYPE-II PORT SELECTION CODEBOOK," filed on May 22, 2020, which is expressly incorporated by reference herein in its entirety.

BACKGROUND

Field

Aspects of the present disclosure relate generally to wireless communication systems, and more particularly, to frequency-selective single frequency network (SFN) based on a modified Type-II port selection codebook.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes receiving, at a UE, one or more channel quality reference signal resources from a serving base station over each sector within a receive area of the UE, wherein each of the one or more channel quality reference signal resources includes one or more antenna ports; reporting, by the UE, a resource selection feedback message to the serving base station, wherein the resource selection feedback message identifies selected channel quality resources of the one or more channel quality reference signal resources for each sector, receiving, at the UE, a channel state information-reference signal (CSI-RS) resource configured with two or more antenna ports and beamformed according to the selected channel quality resources identified in the resource selection feedback message, wherein one of the two or more antenna ports is assigned to one of the each sector within the receive area and another of the two or more antenna ports is assigned to another of the each sector within the receive area, and reporting, by the UE, a port selection feedback for each sector including one or more co-phasing coefficients and an amplitude indicator for each sector, wherein the amplitude indicator identifies a wideband amplitude including one of a wideband quantization level or a wideband dynamic single frequency network (SFN) activation indicator, and a subband amplitude including one of a subband quantization level or a subband dynamic SFN activation indicator.

In an additional aspect of the disclosure, a method of wireless communication includes transmitting, at a base station, one or more channel quality reference signal resources to a served UE over each sector within a receive area of the served UE, wherein each of the one or more channel quality reference signal resources includes one or more antenna ports, receiving, by the base station, a resource selection feedback message from the served UE, wherein the resource selection feedback message identifies selected channel quality resources of the one or more channel quality reference signal resources for each sector, transmitting, at the base station, a CSI-RS resource configured with two or more antenna ports and beamformed according to the selected channel quality resources identified in the resource selection feedback message, wherein one of the two or more antenna ports is assigned to one of the each sector within the receive area and another of the two or more antenna ports is assigned to another of the each sector within the receive area, and receiving, by the base station, a port selection feedback for each sector including one or more co-phasing coefficients and an amplitude indicator for each sector, wherein the amplitude indicator identifies a wideband amplitude including one of a wideband quantization level or a wideband dynamic SFN activation indicator, and a subband amplitude including one of a subband quantization level or a subband dynamic SFN activation indicator.

In an additional aspect of the disclosure, an apparatus configured for wireless communication includes means for receiving, at a UE, one or more channel quality reference signal resources from a serving base station over each sector within a receive area of the UE, wherein each of the one or more channel quality reference signal resources includes one or more antenna ports; means for reporting, by the UE, a resource selection feedback message to the serving base station, wherein the resource selection feedback message identifies selected channel quality resources of the one or more channel quality reference signal resources for each sector, means for receiving, at the UE, a CSI-RS resource configured with two or more antenna ports and beamformed according to the selected channel quality resources identified in the resource selection feedback message, wherein one of the two or more antenna ports is assigned to one of the each sector within the receive area and another of the two or more antenna ports is assigned to another of the each sector within the receive area, and means for reporting, by the UE, a port selection feedback for each sector including one or more co-phasing coefficients and an amplitude indicator for each sector, wherein the amplitude indicator identifies a wideband amplitude including one of a wideband quantization level or a wideband dynamic SFN activation indicator, and a subband amplitude including one of a subband quantization level or a subband dynamic SFN activation indicator.

In an additional aspect of the disclosure, an apparatus configured for wireless communication includes means for transmitting, at a base station, one or more channel quality reference signal resources to a served UE over each sector within a receive area of the served UE, wherein each of the one or more channel quality reference signal resources includes one or more antenna ports, means for receiving, by the base station, a resource selection feedback message from the served UE, wherein the resource selection feedback message identifies selected channel quality resources of the one or more channel quality reference signal resources for each sector, means for transmitting, at the base station, a CSI-RS resource configured with two or more antenna ports and beamformed according to the selected channel quality resources identified in the resource selection feedback message, wherein one of the two or more antenna ports is assigned to one of the each sector within the receive area and another of the two or more antenna ports is assigned to another of the each sector within the receive area, and means for receiving, by the base station, a port selection feedback for each sector including one or more co-phasing coefficients and an amplitude indicator for each sector, wherein the amplitude indicator identifies a wideband amplitude including one of a wideband quantization level or a wideband dynamic SFN activation indicator, and a subband amplitude including one of a subband quantization level or a subband dynamic SFN activation indicator.

In an additional aspect of the disclosure, a non-transitory computer-readable medium having program code recorded thereon. The program code further includes code to receive, at a UE, one or more channel quality reference signal resources from a serving base station over each sector within a receive area of the UE, wherein each of the one or more channel quality reference signal resources includes one or more antenna ports; code to report, by the UE, a resource selection feedback message to the serving base station, wherein the resource selection feedback message identifies selected channel quality resources of the one or more channel quality reference signal resources for each sector, code to receive, at the UE, a CSI-RS resource configured with two or more antenna ports and beamformed according to the selected channel quality resources identified in the resource selection feedback message, wherein one of the two or more antenna ports is assigned to one of the each sector within the receive area and another of the two or more antenna ports is assigned to another of the each sector within the receive area, and code to report, by the UE, a port selection feedback for each sector including one or more co-phasing coefficients and an amplitude indicator for each sector, wherein the amplitude indicator identifies a wideband amplitude including one of a wideband quantization level or a wideband dynamic SFN activation indicator, and a subband amplitude including one of a subband quantization level or a subband dynamic SFN activation indicator.

In an additional aspect of the disclosure, a non-transitory computer-readable medium having program code recorded thereon. The program code further includes code to transmit, at a base station, one or more channel quality reference signal resources to a served UE over each sector within a receive area of the served UE, wherein each of the one or more channel quality reference signal resources includes one or more antenna ports, code to receive, by the base station, a resource selection feedback message from the served UE, wherein the resource selection feedback message identifies selected channel quality resources of the one or more channel quality reference signal resources for each sector, code to transmit, at the base station, a CSI-RS resource configured with two or more antenna ports and beamformed according to the selected channel quality resources identified in the resource selection feedback message, wherein one of the two or more antenna ports is assigned to one of the each sector within the receive area and another of the two or more antenna ports is assigned to another of the each sector within the receive area, and code to receive, by the base station, a port selection feedback for each sector including one or more co-phasing coefficients and an amplitude indicator for each sector, wherein the amplitude indicator identifies a wideband amplitude including one of a wideband quantization level or a wideband dynamic SFN activation indicator, and a subband amplitude including one of a subband quantization level or a subband dynamic SFN activation indicator.

In an additional aspect of the disclosure, an apparatus configured for wireless communication is disclosed. The apparatus includes at least one processor, and a memory coupled to the processor. The processor is configured to receive, at a UE, one or more channel quality reference signal resources from a serving base station over each sector within a receive area of the UE, wherein each of the one or more channel quality reference signal resources includes one or more antenna ports; to report, by the UE, a resource selection feedback message to the serving base station, wherein the resource selection feedback message identifies selected channel quality resources of the one or more channel quality reference signal resources for each sector, to receive, at the UE, a CSI-RS resource configured with two or more antenna ports and beamformed according to the selected channel quality resources identified in the resource selection feedback message, wherein one of the two or more antenna ports is assigned to one of the each sector within the receive area and another of the two or more antenna ports is assigned to another of the each sector within the receive area, and to report, by the UE, a port selection feedback for each sector including one or more co-phasing coefficients and an amplitude indicator for each sector, wherein the amplitude indicator identifies a wideband amplitude including one of a wideband quantization level or a wideband dynamic SFN activation indicator, and a subband amplitude including one of a subband quantization level or a subband dynamic SFN activation indicator.

In an additional aspect of the disclosure, an apparatus configured for wireless communication is disclosed. The apparatus includes at least one processor, and a memory coupled to the processor. The processor is configured to transmit, at a base station, one or more channel quality reference signal resources to a served UE over each sector within a receive area of the served UE, wherein each of the one or more channel quality reference signal resources includes one or more antenna ports, to receive, by the base station, a resource selection feedback message from the served UE, wherein the resource selection feedback message identifies selected channel quality resources of the one or more channel quality reference signal resources for each sector, to transmit, at the base station, a CSI-RS resource configured with two or more antenna ports and beamformed according to the selected channel quality resources identified in the resource selection feedback message, wherein one of the two or more antenna ports is assigned to one of the each sector within the receive area and another of the two or more antenna ports is assigned to another of the each sector within the receive area, and to receive, by the base station, a port selection feedback for each sector including one or more co-phasing coefficients and an amplitude indicator for each sector, wherein the amplitude indicator identifies a wideband amplitude including one of a wideband quantization level or a wideband dynamic SFN activation indicator, and a subband amplitude including one of a subband quantization level or a subband dynamic SFN activation indicator.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
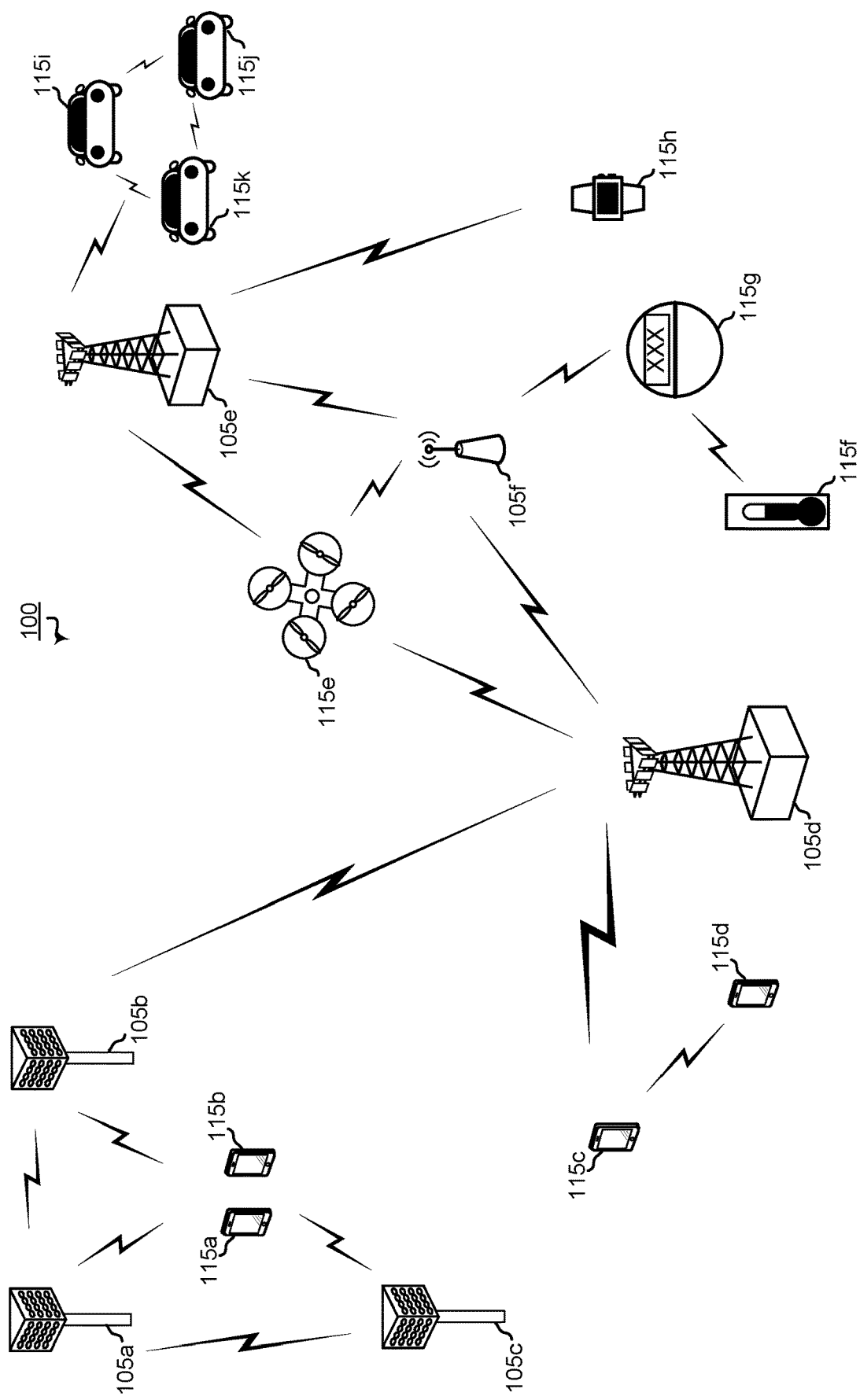
FIG. 1 is a block diagram illustrating details of a wireless communication system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ultra-high density (e.g., ~1M nodes/km$^2$), ultra-low complexity (e.g., ~10 s of bits/sec), ultra-low energy (e.g., 10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

A UE and a base station may each include one or more radio frequency (RF) chains, each RF chain can include a precoder and amplification. The precoder relates data to be transmitted with output symbols in accordance with the characteristics of the channels on which the data is transmitted. In general, precoding can take the form of Y=W·x, where x represents the symbols to be transmitted, W is a precoding matrix, and Y is the symbols for transmission according to the available resources. In many systems, as discussed below, the precoder can reacts according to the characteristics of a channel. In many systems, the channel can be analyzed to determining the channel characteristics.

In wireless communications, channel state information (CSI) may refer to known channel properties of a communication link. The CSI may represent how a signal may propagate over-the-air from a transmitter to a receiver. The CSI may represent the combined channel effects of, for example, scattering, fading, and/or power decay with distance between the transmitter and the receiver. Channel estimation may be performed to determine these effects on the channel. CSI may be used to adapt transmissions based on the current channel conditions, which may be useful for achieving reliable communication, in particular, with high data rates in multi-antenna systems. CSI is typically estimated at a receiver, quantized, and fed back to a transmitter. CSI may include various feedback information, such as rank indicator (RI), channel quality indicator (CQI), and/or precoding matrix indicator (PMI). CSI may be used report radio channel quality information to the base station.

The UE may receive one or more CSI-RSs from the base station, determine channel properties, determine a plurality of precoding coefficients based on the channel properties, and feedback the precoding coefficients to the base station (e.g., in a CSI report). The base station may receive the plurality of precoding coefficients and apply them for downlink beamforming/precoding to provide the UE with the best downlink signal quality.

The present disclosure describes mechanisms for transmitting CSI feedback to reduce the CSI payload. In some examples, the base station may utilize codebook-based transmissions to form beam(s) for communication with the UE. A codebook may include a set of frequency domain (FD) beamforming components, each identified by an index. An FD beamforming component may also be referred to as an FD basis vector, FD basis, or a basis vector. In some aspects, the base station may restrict the UE to a subset of the FD beamforming components in the codebook. For example, the base station may indicate the restricted subset by indicating the indexes (in various forms) from which the UE can select. By reducing the set of FD beamforming components, complexity and power consumption at the UE may be reduced.

In some aspects, the base station may indicate one or more groups of CSI-RS ports with spatial-frequency beamforming. By indicating the group information of the CSI-RS ports with spatial-frequency beamforming, the CSI reporting accuracy may be improved compared with deriving downlink channel status solely by uplink sounding, when the downlink-uplink reciprocity is partial (e.g., in FDD systems or TDD systems where the uplink and the downlink are not transmitted in the same subbands).

FIG. 1 is a block diagram illustrating an example of a wireless communications system 100 that supports a modified two-step CSI operation in which the amplitude information for the Type-II port selection codebook includes additional bits to accommodate a dynamic subband SFN activation indicator in accordance with aspects of the present disclosure. The network 100 may be a 5G network. The network 100 includes a number of base stations 105 (individually labeled as 105a, 105b, 105c, 105d, 105e, and 105f) and other network entities. A base station 105 may be a station that communicates with UEs 115 and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station 105 and/or a base station subsystem serving the coverage area, depending on the context in which the term is used.

A base station 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105d and 105e may be regular macro base stations, while the base stations 105a-105c may be macro base stations enabled with one of three dimension (3D), full dimension (FD), or massive MIMO. The base stations 105a-105c may take advantage of their higher dimension MIMO capabilities to exploit 3D beamforming in both elevation and azimuth beamforming to increase coverage and capacity. The base station 105f may be a small cell base station which may be a home node or portable access point. A base station 105 may support one or multiple (e.g., two, three, four, and the like) cells.

The network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the base stations, whether macro base station, small cell, or the like. In FIG. 1, a lightning bolt (e.g., communication links) indicates wireless transmissions between a UE 115 and a serving base station 105, which is a base station designated to serve the UE 115 on the downlink and/or uplink, desired transmission between base stations 105, backhaul transmissions between base stations, or sidelink transmissions between UEs 115.

In operation, the base stations 105a-105c may serve the UEs 115a and 115b using 3D beamforming and coordinated spatial techniques, such as coordinated multipoint (CoMP) or multi-connectivity. The macro base station 105d may perform backhaul communications with the base stations 105a-105c, as well as small cell, the base station 105f. The macro base station 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The base stations 105 may also communicate with a core network. The core network may provide user authentication, access authorization, tracking, Internet Protocol (IP) connectivity, and other access, routing, or mobility functions. At least some of the base stations 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the base stations 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro base stations 105d and 105e, as well as links from the small cell base station 105f. Other machine type devices, such as the UE 115f (e.g., a thermometer), the UE 115g (e.g., smart meter), and UE 115h (e.g., wearable device) may communicate through the network 100 either directly with base stations, such as the small cell base station 105f, and the macro base station 105e, or in multi-step-size configurations by communicating with another user device which relays its information to the network, such as the UE 115f communicating temperature measurement information to the smart meter, the UE 115g, which is then reported to the network through the small cell base station 105f. The network 100 may also provide additional network efficiency through dynamic, low-latency TDD/FDD communications, such as V2V, V2X, C-V2X communications between a UE 115*i*, 115*j*, or 115*k* and other UEs 115, and/or vehicle-to-infrastructure (V2I) communications between a UE 115*i*, 115*j*, or 115*k* and a base station 105.

In some implementations, the network 100 utilizes OFDM-based waveforms for communications. An OFDM-based system may partition the system bandwidth into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system bandwidth. The system bandwidth may also be partitioned into subbands. In other instances, the subcarrier spacing and/or the duration of TTIs may be scalable.

In some aspects, the base stations 105 can assign or schedule transmission resources (e.g., in the form of time-frequency resource blocks (RB)) for downlink and uplink transmissions in the network 100. Downlink refers to the transmission direction from a base station 105 to a UE 115, whereas uplink refers to the transmission direction from a UE 115 to a base station 105. The communication can be in the form of radio frames. A radio frame may be divided into a plurality of subframes or slots, for example, about 10. Each slot may be further divided into mini-slots. In a FDD mode, simultaneous uplink and downlink transmissions may occur in different frequency bands. For example, each subframe includes an uplink subframe in an uplink frequency band and a downlink subframe in a downlink frequency band. In a TDD mode, uplink and downlink transmissions occur at different time periods using the same frequency band. For example, a subset of the subframes (e.g., downlink subframes) in a radio frame may be used for downlink transmissions and another subset of the subframes (e.g., uplink subframes) in the radio frame may be used for uplink transmissions.

The downlink subframes and the uplink subframes can be further divided into several regions. For example, each downlink or uplink subframe may have pre-defined regions for transmissions of reference signals, control information, and data. Reference signals are predetermined signals that facilitate the communications between the base stations 105 and the UEs 115. For example, a reference signal can have a particular pilot pattern or structure, where pilot tones may span across an operational BW or frequency band, each positioned at a pre-defined time and a pre-defined frequency. For example, a base station 105 may transmit cell specific reference signals (CRSs) and/or channel state information—reference signals (CSI-RSs) to enable a UE 115 to estimate a downlink channel. Similarly, a UE 115 may transmit sounding reference signals (SRSs) to enable a base station 105 to estimate an uplink channel. Control information may include resource assignments and protocol controls. Data may include protocol data and/or operational data. In some aspects, the base stations 105 and the UEs 115 may communicate using self-contained subframes. A self-contained subframe may include a portion for downlink communication and a portion for uplink communication. A self-contained subframe can be downlink-centric or uplink-centric. A downlink-centric subframe may include a longer duration for downlink communication than for uplink communication. A uplink-centric subframe may include a longer duration for uplink communication than for uplink communication.

In some aspects, the network 100 may be an NR network deployed over a licensed spectrum. The base stations 105 can transmit synchronization signals (e.g., including a primary synchronization signal (PSS) and a secondary synchronization signal (SSS)) in the network 100 to facilitate synchronization. The base stations 105 can broadcast system information associated with the network 100 (e.g., including a master information block (MIB), remaining system information (RMSI), and other system information (OSI)) to facilitate initial network access. In some instances, the base stations 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a base station 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical uplink control channel (PUCCH), physical uplink shared channel (PUSCH), power control, and SRS.

After establishing a connection, the UE 115 and the base station 105 can enter a normal operation stage, where operational data may be exchanged. For example, the base station 105 may schedule the UE 115 for uplink and/or downlink communications. The base station 105 may transmit uplink and/or downlink scheduling grants to the UE 115 via a PDCCH. The scheduling grants may be transmitted in the form of downlink control information (DCI). The base station 105 may transmit a downlink communication signal (e.g., carrying data) to the UE 115 via a PDSCH according to a downlink scheduling grant. The UE 115 may transmit an uplink communication signal to the base station 105 via a PUSCH and/or PUCCH according to an uplink scheduling grant.

In some aspects, the network 100 may operate over a system BW or a component carrier (CC) BW. The network 100 may partition the system BW into multiple BWPs (e.g., portions). A base station 105 may dynamically assign a UE 115 to operate over a certain BWP (e.g., a certain portion of the system BW). The assigned BWP may be referred to as the active BWP. The UE 115 may monitor the active BWP for signaling information from the base station 105. The base station 105 may schedule the UE 115 for uplink or downlink communications in the active BWP. In some aspects, a base station 105 may assign a pair of BWPs within the CC to a UE 115 for uplink and downlink communications. For example, the BWP pair may include one BWP for uplink communications and one BWP for downlink communications.

In some aspects, the base station 105 and the UE 115 may communicate with each other by utilizing MIMO and beamforming techniques. For instance, the base station 105 may transmit reference signals to the UE 115. The reference signals may be referred to as CSI-RSs and include predetermined pilot symbols so that the UE 115 may estimate a downlink channel between the base station 105 and the UE 115. To facilitate beamforming at the base station 105, the UE 115 may feedback CSI (e.g., estimate of the downlink channel) to the base station 105. In some aspects, the base station 105 may perform precoding to generate transmission beams with a certain directivity and/or a certain transmit power. The precoding process may include weighting signal phases and/or signal amplitudes at antenna elements of the base station 105.

In some aspects, the base station 105 and the UE 115 may have an array of antenna elements and may apply beamforming techniques to communicate with each other. The antenna array may be in the form of a single panel or multiple panels. Each antenna panel may include a plurality of antenna ports or elements in a vertical dimension and a plurality of antenna ports or elements in a horizontal dimension. In some examples, the base station 105 may have multi-panel antennas and the UE 115 may have a single-panel antenna. In some other examples, the base station 105 and the UE 115 may each have multi-panel antennas. The base station 105 may form beams in an array of angular directions by weighting signal phases and amplitudes at the antenna elements and may utilize the best beam to communicate with the UE 115. The best beam may refer to a high-quality beam, for example, where the beam may have a highest received signal power among a set of beams measured at the UE 115.

In some aspects, the UE 115 may utilize a Type II codebook for CSI feedbacks as described in 3GPP document TS 38.214 Release 15, titled "3$^{rd}$ Generation Partnership Project; Technical Specification Group Radio Access Network; NR; Physical layer procedures for data," December, 2019, Section 5.2.2, which is incorporated herein by reference. The UE 115 may report CSI based on a Type II codebook.

For port selection in certain systems (e.g., Rel-15 NR port selection), the base station 105 may use a beam as the precoder for CSI-RS. The base station may have $N_{tx}$ transmission antennas, and the downlink channel response matrix for a certain subband may be denoted as H. By applying a respective beamforming weight (denoted as a column vector $w_i$) to each transmission antenna, the base station 105 may generate an antenna port. A CSI-RS port may refer to a port on which a CSI-RS sequence is transmitted. The base station 105 may generate a total of P ports, where $P<=N_{tx}$. The equivalent downlink channel response vector for beamforming weight $w_i$ may be equal to $Hw_i$ at a particular subband. Additionally, for all P ports, the composite equivalent downlink channel response matrix may be $H \cdot [w_1, w_2, \ldots, w_P]$, which has P layers. It should be understood that a vector may also be referred to as a component in the present disclosure.

The precoder for a layer on a subband may be given by the following equation:

$$\begin{pmatrix} \sum_{i=0}^{L-1} v_{i_{11}d+i} \cdot p_i^{(1)} \cdot p_i^{(2)} \cdot \phi_i \\ \sum_{i=0}^{L-1} v_{i_{11}d+i} \cdot p_{i+L}^{(1)} \cdot p_{i+L}^{(2)} \cdot \phi_{i+L} \end{pmatrix}, \quad (1)$$

where $(v_{i_{11}d+i})$ represents a vector, $p_i^{(1)}$ denotes a wideband amplitude value that is common to all subbands, $p_i^{(2)}$ denotes a subband amplitude value that may be different for each subband, and $\phi_i$ denotes a subband phase value that may be different for each subband. In Equation (1), the top row may represent beamforming components for a first polarization and the bottom row may represent beamforming components for a second polarization.

In this example, the UE 115 may select the CSI-RS ports rather than selecting the beam. Thus, using Equation (1) in the port selection codebook, if the $(i_{11}d+i)$-th entry of the vector $(v_{i_{11}d+i})$ is equal to 1 and the rest are 0s, then the UE 115 may select the $(i_{11}d+i)$-th entry port. With this codebook, there are P ports, where the first half of the ports are for polarization 1 and the other half of the ports are for polarization 2, and the same L ports are applied to both polarizations. The UE 115 may report the preferred candidate L ports via $i_{11}$, where the first candidate L ports may be $0 \ldots L-1$, the second candidate L ports may be d d+L−1, and the last candidate L ports may be $$\left[\frac{P}{2d}\right]d, \ldots, \text{mod}\left(\left[\frac{P}{2d}\right]d + L - 1, \frac{P}{2}\right).$$

In this case, the UE 115 may be restricted to select L consecutive ports (e.g., port $i_{11}d \ldots i_{11}d+L-1$) per subband, potentially reducing the CSI payload. The restriction, however, may lack flexibility and not lead to optimal performance. A more flexible selection may lead to a large CSI payload and overhead signaling.

To overcome the issue of port selection discussed above, the UE 115 may report port selection(s) using a port selection codebook with spatial-frequency 2D beamforming (e.g., Rel-17 NR port selection with spatial-frequency 2D beamforming). For example, with Type II port selection codebook with spatial-frequency beamforming, the UE 115 may transmit a reference signal (e.g., SRS) to the base station 105, which receives the reference signal and generates a number of wideband beamforming ports. For example, the base station 105 may estimate the uplink channel status for each subband and determine a number of downlink spatial domain (SD) beamforming weight components for each subband based on downlink-uplink reciprocity. Subsequently, the base station 105 may determine a number of downlink frequency domain (FD) beamforming weight components for each SD beamforming weight component based on the corresponding weight values of all subbands. Additionally, the base station 105 may determine a wideband beamforming port by linearly combining a number of weighted wideband beamforming weight components for one or more SD beamforming weight components and one or more FD beamforming weight components, regarded as spatial-frequency 2D beamforming.

The base station 105 may transmit wideband CSI-RSs with the wideband beamforming ports and additionally a CSI report configuration message to the UE 115, where the CSI report configuration message indicates that the CSI report is based on port selection with these CSI-RS ports. The UE 115 may receive the wideband CSI-RSs with the wideband beamforming ports and the CSI report configuration message from the base station 105, select a number of the received wideband CSI-RS ports, and combine them with a respective coefficient for each port. The UE 115 may then report the port selection result and the respective coefficients in the CSI report to the base station 105.

The expression of spatial-frequency 2D beamforming may be expressed in a variety of ways. For example, if a wideband beamforming port uses a transmission antenna with one polarization, the precoding matrix may be generated in accordance with equation:

$$W = \sum_{i=0}^{L-1}\sum_{m=0}^{M-1} b_i \cdot f_m^H \cdot d_{i,m}, \quad (2)$$

where W is a matrix, L represents a number of SD beamforming weight components, M represents a number of FD beamforming weight components, m represents an index of a set of candidate FD beamforming components (e.g., all possible FD beamforming components), $b_i$ represents a SD beamforming weight component, $f_m^H$ represents an FD beamforming weight component, and $d_{i,m}$ represents a wideband coefficient. Each column of W represents a precoding component (e.g., precoding vector) for a subband. In other examples, these precoding components may be different.

In another example, if a wideband beamforming port uses a transmission antenna with two polarizations, the precoding matrix of each polarization, denoted as $W_1$, $W_2$, has the same form as W. The SD beamforming weight components $\{b_i\}$ and FD beamforming weight components $(f_m^H)$ may be identical or different between these two polarizations.

In some aspects, the CSI-RS port precoding and selection may be polarization-common or polarization-specific. For polarization-common port-selection, the same port may be used for each polarization. In some examples, the base station 105 may use the same precoder on corresponding ports in the different polarization. In some examples, the UE 115 assumes an organization of the CSI-RS. The organization may be configured by the base station 105 or specified in a wireless standard.

For polarization-common port-selection, a first half of CSI-RS ports may use transmission antennas on polarization 1 and the other half of CSI-RS ports may use transmission antennas on polarization 2, where these two polarizations may have the same SD beamforming weight components; although other uneven splits of the ports could be done for the polarizations. It may be precoded (port-wise) similar to the second half of the CSI-RS ports.

With polarization-common port-selection, the PMI for a layer on any of the $N_3$ FD units may be provided in accordance with equation:

$$\begin{pmatrix} \sum_{k=0}^{K_0/2-1} v_{i_k} \cdot c_k \\ \sum_{k=0}^{K_0/2-1} v_{i_k} \cdot c_{k+k_0/2} \end{pmatrix}, \quad (3)$$

where $v_{i_k}$ is of size $$\frac{P}{2} \times 1$$

with only one "1" in row $i_k$ (if there is only one "1" in row $i_k$, then the $i_k$-th port is selected on all $N_3$ FD units), where P is the total number of CSI-RS ports, $c_k$ represents the linear combination coefficient associated with port $i_k$ on polarization 1 (which is a wideband coefficient), $c_{k+k_0/2}$ represents the linear combination coefficient associated with port $i_k$ on polarization 2 (which is a wideband coefficient), and $K_0/2$ represents a number of CSI-RS ports that the UE may use to generate the linear combination for computing the PMI in equation (3). The UE 115 may report CSI-RS ports $i_0, \ldots i_{k_0/2-1}$ and port coefficients $c_0, \ldots c_{k_0-1}$ or a subset of port coefficients $c_0, \ldots c_{k_0-1}$, where the unreported port coefficients are set to 0.

For polarization-specific port-selection, the base station 105 may use different precoders on CSI-RS ports in the different polarization. For example, a first portion of CSI-RS ports (e.g., 20 CSI-RS ports) may use transmission antennas on polarization 1, and a second portion of CSI-RS ports (e.g., 12 CSI-RS ports) may use transmission antennas on polarization 2. In some examples, the UE 115 may select any of the CSI-RS ports for combining.

With polarization-specific port-selection, the PMI for a layer on any of the $N_3$ FD units may be provided in accordance with equation.

$$\sum_{k=0}^{k_0-1} v_{i_k} \cdot c_k, \quad (4)$$

where $v_{i_k}$ is of size P×1 with only one "1" in row $i_k$ (the $i_k$-th port is selected on all $N_3$ FD units), where P is the total number of CSI-RS ports, $c_k$ represents the linear combination coefficient associated with port $i_k$, and $K_0$ represents a number of CSI-RS ports that the UE uses to generate the linear combination for computing PMI in equation (4). The UE 115 may report CSI-RS ports $i_0, \ldots i_{k_0-1}$ and port coefficients $c_0, \ldots c_{k_0}^{-1}$ or a subset of port coefficients $c_0, \ldots c_{k_0-1}$, where the unreported port coefficients are set to 0.

Accordingly, use of the port selection codebook with spatial-frequency 2D beamforming discussed in Rel-17 may reduce the CSI feedback payload compared to the Rel-15 NR port selection because, for example, the UE 115's reported port selection result is for wideband usage rather than for each subband usage. Additionally, use of the port selection codebook with spatial-frequency 2D beamforming discussed in Rel-17 may improve CSI report accuracy compared with deriving downlink channel status solely by uplink sounding, when the downlink-uplink reciprocity is impartial (e.g., in FDD systems or in TDD systems, where uplink and downlink are not transmitted on the same subbands).

To overcome the issue of large amounts of CSI overhead signaling discussed above, the UE 115 may report port selection(s) using a Type II candidate with frequency compression (e.g., Rel-16 NR). For example, with Type II codebook or Type II port selection codebook with FD compression, the UE 115 may be configured to report FD compressed precoder feedback to reduce overhead of the CSI report.

In some examples, the base station 105 transmits CSI-RS to the UE 115, which determines the PMI and transmits a CSI report based on the received CSI-RS to the base station 105. With codebook operation with FD compression for one layer, the UE 115 may exploit the sparsity of both spatial and frequency domains by determining a compressed Type II precoder W in accordance with equation (5):

$$W = W_1 \times \tilde{W}_2 \times W_f^H, \quad (5)$$

where W represents a compressed Type II precoder, $W_1$ is a matrix and represents the SD beamforming component including L beams (e.g., L columns) per polarization group (e.g., a hence a total of 2L beams), $\tilde{W}_2$ is a matrix and includes a plurality of candidate linear combination coefficients (e.g., all the required linear combination coefficients) (including amplitude and phase), where each element represents the coefficient of a tap for a beam, and $W_f^H$ is a matrix composed of the components (each row is a component) used to perform compression in the FD. The components in $W_f^H$ may be derived from a certain number of columns in a discrete Fourier transform (DFT) matrix.

The UE 115 may report the quantization results of $W_1$, $\tilde{W}_2$, and $W_f^H$ for all layers as PMI. With Type II port selection codebook with frequency compression, if the base station 105 uses one or more SD beamforming components at the CSI-RS ports, then the UE 115 may determine and report only $\tilde{W}_2$ and $W_f^H$. In this example, the UE 115 may not be requested to determine and report the SD beamforming component matrix $W_1$.

The UE 115 may have some difficulty estimating the channel or selecting ports. For example, with Type II codebook with FD compression (with or without port selection), the base station 105 does not provide any information or restriction for the UE to report the FD beamforming components in $W_f^H$. The UE 115 may transmit SRS to the base station 105, which may derive information on the radio channel from the SRS. It may be desirable for the base station 105 to provide some guidance for the UE 115 to select the FD beamforming components. In doing so, the UE 115 can be assisted to determine optimal FD beamforming components. Additionally, calculation complexity may be reduced at the UE 115 as a result of having a smaller subset of FD beamforming components from which to select, potentially saving energy at the UE 115.

Additionally, with Type II port selection codebook with spatial-frequency beamforming, for either polarization-common port selection or polarization-specific port selection, the UE 115 may estimate the channel gain for each received CSI-RS port, select a number of the CSI-RS ports, and combine them with a respective coefficient to each port. The FD beamforming components that are used by the base station 105 may be unknown to the UE 115. On one hand, the power delay profile of the FD beamformed channel may be moved or shifted compared with the one without FD beamforming, potentially causing difficulty for the UE 115 to determine which time-domain window in the power delay profile should be adopted. Accordingly, channel estimation performance may be worse in this scenario than in a case without FD beamforming. On the other hand, without information of FD beamforming, it may be difficult for the UE 115 to determine or restore the non-beamformed channel response matrix, potentially causing difficulty for the UE 115 to select the optimal ports and determine the port combination coefficients that may lead to the maximum combined beamforming gain. It may be desirable for the base station 105 to indicate information about the spatial-frequency 2D beamforming in the CSI-RS port generation so that the UE 115 can improve channel estimation performance and derive a better or the best port selection result and port combination coefficients.

Figure 2:
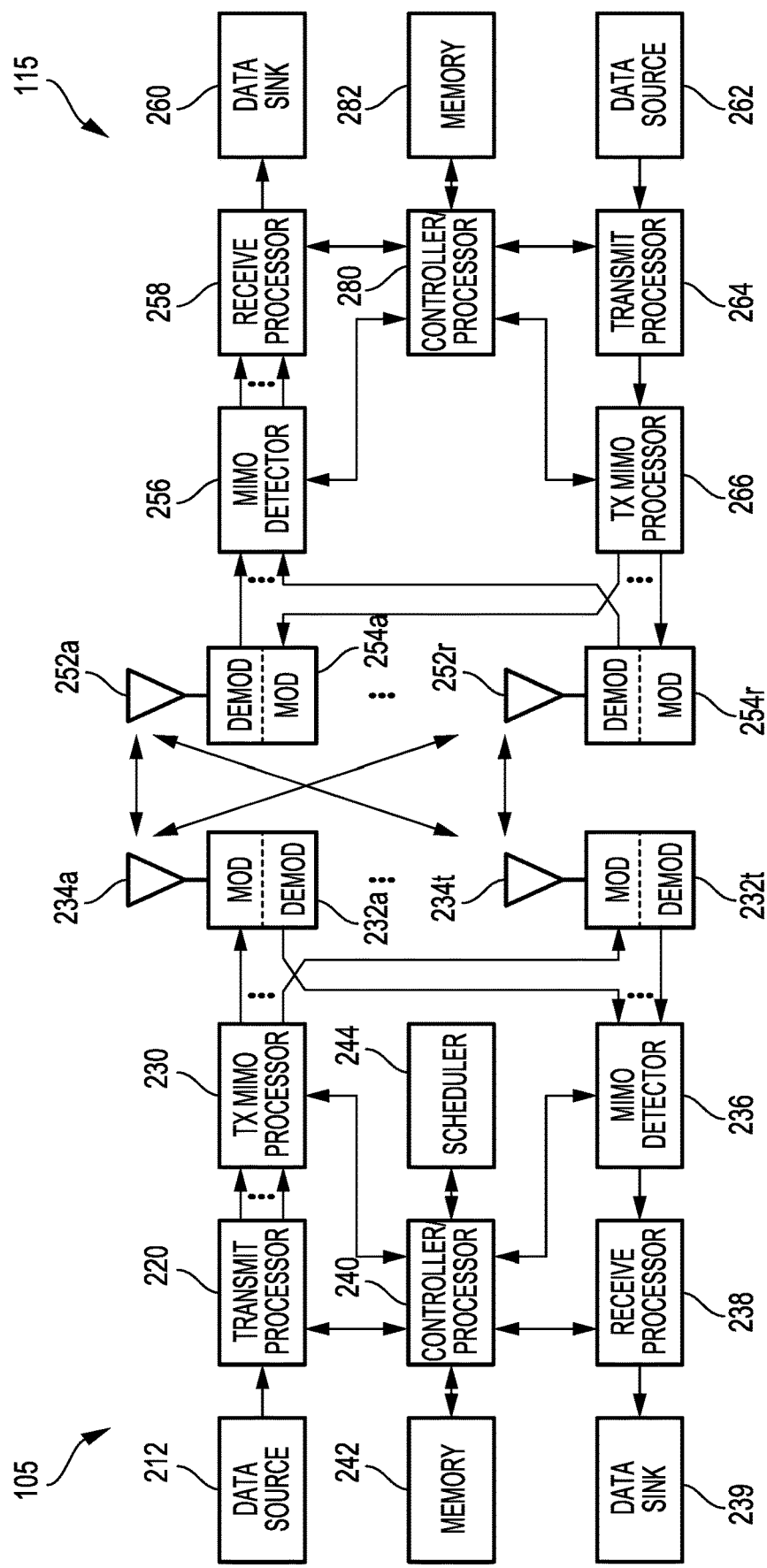
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 4A and 4B, and/or other processes for the techniques described herein. The memories 242 and 282 may store data and program codes for the base station 105 and the UE 115, respectively. A scheduler 244 may schedule UEs for data transmission on the downlink and/or uplink.

5G NR systems have been suggested to support transmissions to UEs from multiple transmission-reception points (TRPs). Where such transmissions may occur jointly, throughput may be improved in such communications. Multiple TRP (Multi-TRP) transmissions may occur from TRPs with the same physical cell identifier (PCID) or from TRPs with different PCIDs. In order to account for the backhaul delay between the multiple TRPs, non-coherent joint transmission (NCJT) techniques may be used for the transmission. In one example of multi-TRP transmission, each sector of a multi-sector base station, which operate under the same PCID. In such multi-sector multi-TRP operations, there would be no backhaul delay, since each sector is controlled by the same base station. As such, coherent joint transmission (CJT) techniques may be possible for the multi-TRP transmissions.

For NCJT techniques, the received signal includes a summation of the signals transmitted by each of the TRPs. The received NCJT signal may be represented by the following equation:

$$y_{RX,NCJT} = \alpha_1 h_1^T w_1 x + \alpha_2 h_2^T w_2 x \qquad (6)$$

Where y represents the received signal, $\alpha_i$ represents the amplitude value of the $i^{th}$ TRP, $h_i^T$ represents the channel vector between the UE and the $i^{th}$ TRP, $w_i$ represents the beam vector at the $i^{th}$ TRP, and x represents the data transmission. For CJT techniques, the received signal also includes a summation of the signals transmitted by each of the TRPs. However, CJT also includes a co-phasing coefficient that represents the phase between the transmissions. The received CJT signal may be represented by the following equation:

$$y_{RX,CJT} = \alpha_1 h_1^T w_1 x + \alpha_2 e^{j\theta} h_2^T w_2 x \qquad (7)$$

Where $e^{j\theta}$ represents the co-phasing coefficient that identifies the phase difference between the transmission of the first TRP and the second TRP. The co-phasing coefficient allows for the summation of the transmissions from the TRPs to be summed in-phase rather than out-of-phase, as in the NCJT technique. As such, the CJT summation of TRP transmissions results in a larger amplitude than the NCJT summation. In order to manage CSI feedback for such multi-TRP operations in which each of the TRPs has the same PCID, the aspects of the present disclosure provide for a two-step hybrid CSI procedure which includes additional amplitude information feedback from a UE to dynamically signal activation/deactivation of both wideband and subband SFN operations.

Figure 3:
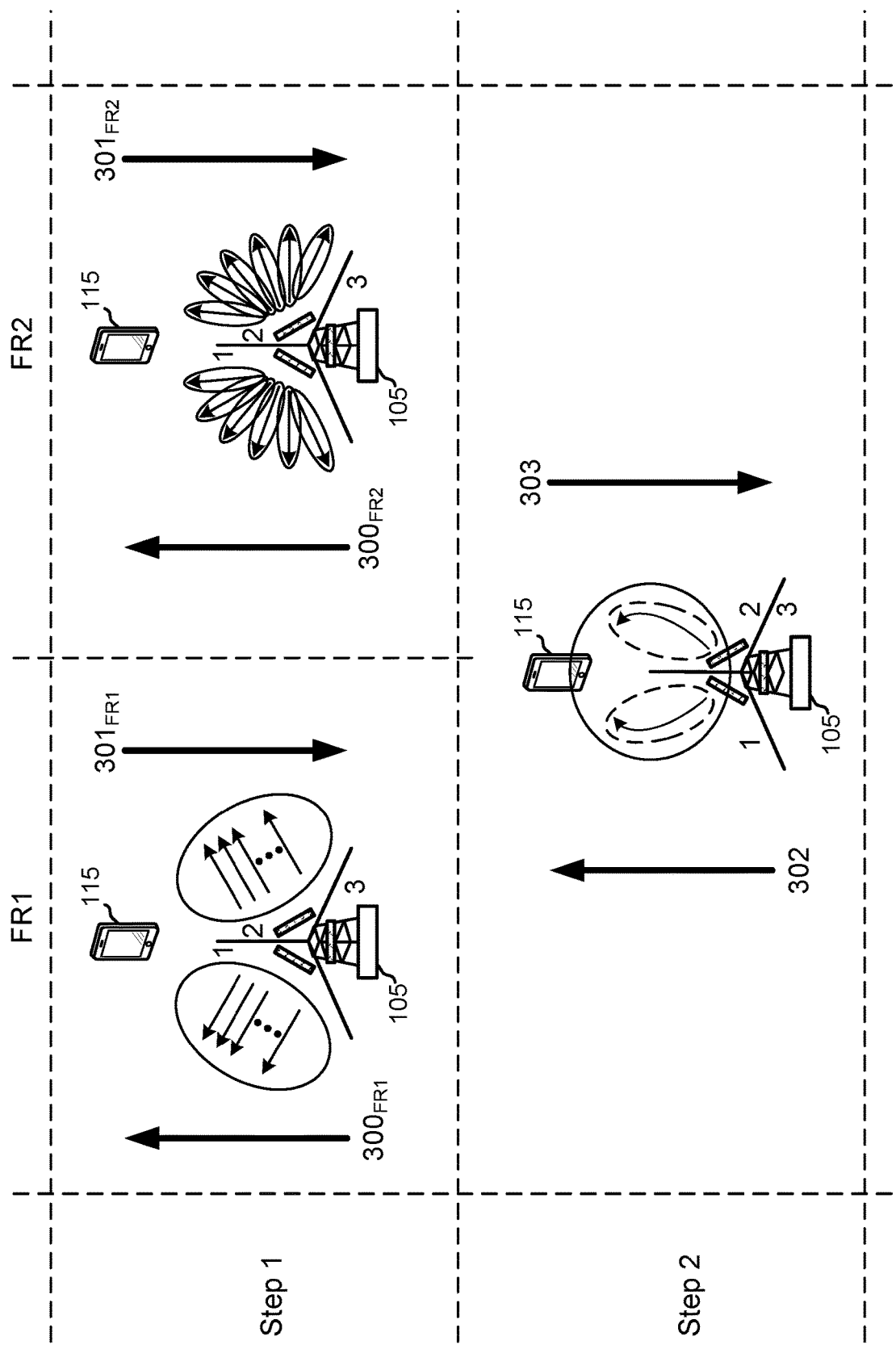
FIG. 3 is a process diagram illustrating a two-step hybrid CSI procedure operable with a 5G NR network.

FIG. 3 is a process diagram illustrating a two-step hybrid CSI procedure operable with a 5G NR network. The hybrid CSI procedure identified may be implemented using a two-step procedure. The first step of the two-step hybrid CSI procedure may include slightly different operations depending on whether the subject communications occur over the lower frequency range for 5G networks, frequency range 1 (FR1) or the higher mmWave frequency range for 5G networks, frequency range 2 (FR2). FR1 may typically include the sub-6 GHz frequency bands, while FR2 may typically include the mmWave range between 24.25 GHz and 52.6 GHz. However, each of FR1 and FR2 may include additional, similar ranges where new frequency bands may be opened up for 5G NR operations. The process diagram of FIG. 3 includes base station 105 having an antenna array that generates three sectors, sectors 1-3. The illustrated example process includes communications between base station 105 and UE 115.

In step 1 for FR1 operations, base station 105 transmits configuration $300_{FR2}$ for one CSI-RS resource with $2N_1N_2$ ports for CSI reporting from each of sectors 1 and 2 (e.g., one CSI-RS resource per sector). UE 115 observes the channel quality reference signal (e.g., the CSI-RS resource) and selects appropriate precoders from the Type-I single panel codebook and generates CSI report $301_{FR1}$ for transmission to base station 105 for each of sectors that includes the corresponding selected precoders.

In step 1 for FR2 operations, base station 105 transmits configuration $300_{FR2}$ for one or more CSI-RS resources having 1 or 2 ports for beam management from each of sectors 1 and 2 (e.g., one or more CSI-RS resources per sector). The one or more CSI-RS resources are transmitted in multiple mmWave beams in each sectors. Alternatively, base station 105 may use synchronization signal blocks (SSBs) for step 1 of the two-step process instead of CSI-RS. UE 115 observes the multiple channel quality reference signal beams (e.g., CSI-RS, SSB, etc.), and selects the most favorable beam, such as the beam having the highest signal quality, reference signal receive power (RSRP), etc. CSI report $301_{FR2}$ includes identification of the beam index of the selected beam, which may include the CSI-RS resource indicator (CRI), in the case where the channel quality reference signal is a CSI-RS, or an SSB-index, in the case where the channel quality reference signal is an SSB. The UE transmits this CSI report $301_{FR2}$ including the beam index (e.g., CRI or SSB-index) for each of sectors 1 and 2.

Step 2 of the two-step process operates in a similar manner for both of FR1 and FR2. In step 2, base station 105 transmits configuration 302 for one CSI-RS resource with 2 ports for beam management, in which each of the two ports is assigned to a different sector. As such, on port of the CSI-RS resource configured via configuration 302 is assigned to sector 1 and the other port is assigned to sector 2. Each port may then be beamformed by using the beam determined in CSI report $301_{FR1}$ or $301_{FR2}$, during the first step. In order to refine the CSI feedback from UE 115, UE 115 observes the CSI-RS resource and selects port selection information from the Type-II port selection codebook for both of sectors 1 and 2. The port selection information identifies the precoder that includes both co-phasing information and the amplitude information for each sector, $W_{k,r,l}$. This selected Type-II port selection codebook precoder may be represented by the following equation:

$$w_{k,r,l} = \sum_{i=1}^{L} p_{r,l,i}^{WB} p_{k,r,l,i}^{SB} \varphi_{k,r,l,i}^{SB} b_i \qquad (8)$$

Where L represents the number of selected/reported beams, which may be preconfigured, k represents the subband index, r represents the polarization indicator (+ or −), l represents the layer index (1 or 2), i represents the selected beamformed CSI-RS beam index (1, . . . , L), and $b_i$ represents the $i^{th}$ selected beamformed CSI-RS beam. UE 115 includes this precoder in the port selection information in CSI report 303 transmitted to base station 105.

The co-phasing information of the port selection information in CSI report 303 includes co-phasing coefficients for the subband transmissions. As illustrated in FIG. 3, the two-step CSI procedure reflects the legacy procedure. As such, the amplitude information includes 3-bits for wideband amplitude information, which may reflect either a quantization level of the amplitude of wideband transmissions or a dynamic single frequency network (SFN) activation indicator for the wideband transmissions. For the subband operations, the legacy procedure includes 1-bit that is used to identify the subband amplitude quantization level. The legacy two-step CSI procedure does not include dynamic SFN control at the subband level. If UE 115 includes the dynamic SFN activation indicator in the wideband amplitude information of CSI report 303, base station 105 may then dynamically switch between no-SFN and SFN transmissions. Base station 105 may use the co-phasing coefficients fed back via CSI report 303 to perform coherent combining.

Figure 4A:
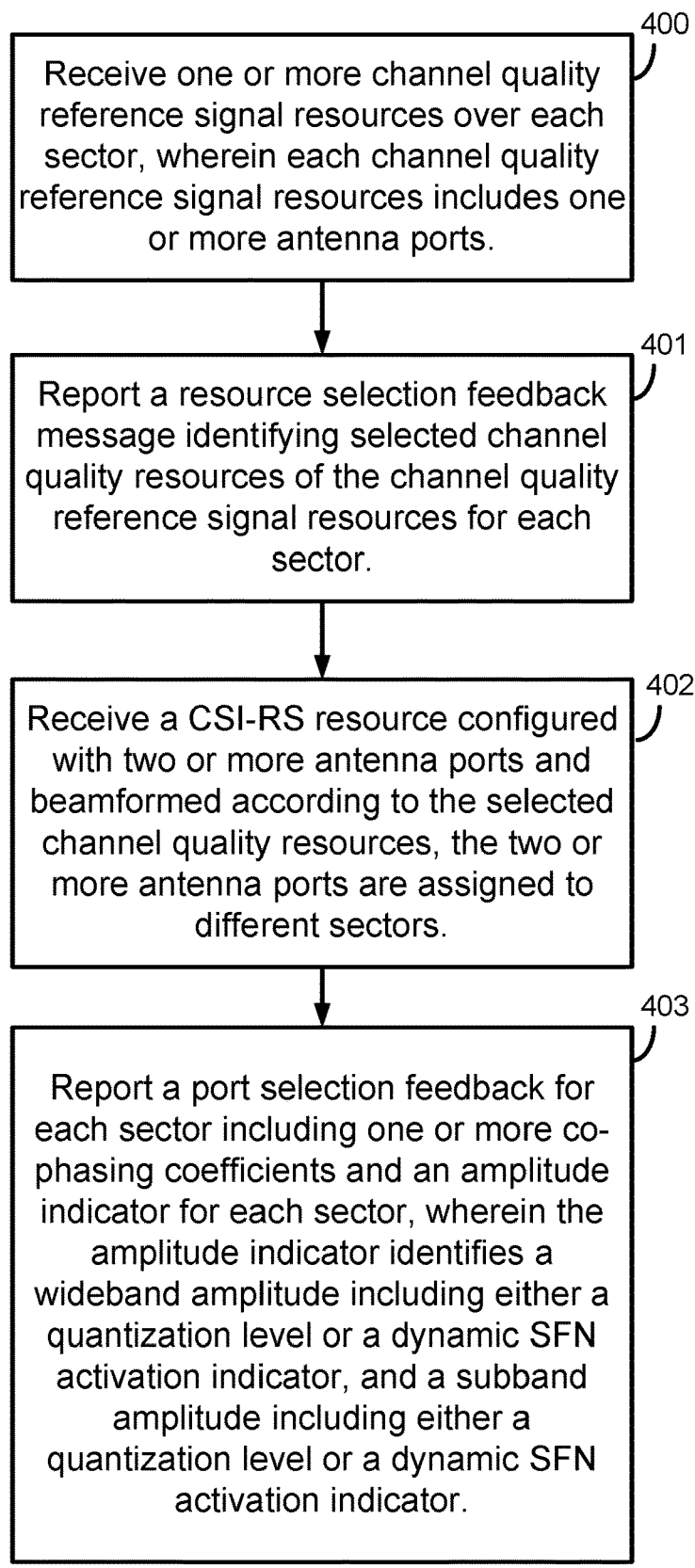
FIGS. 4A and 4B are block diagrams illustrating example blocks executed to implement one aspect of the present disclosure.
Figure 4B:
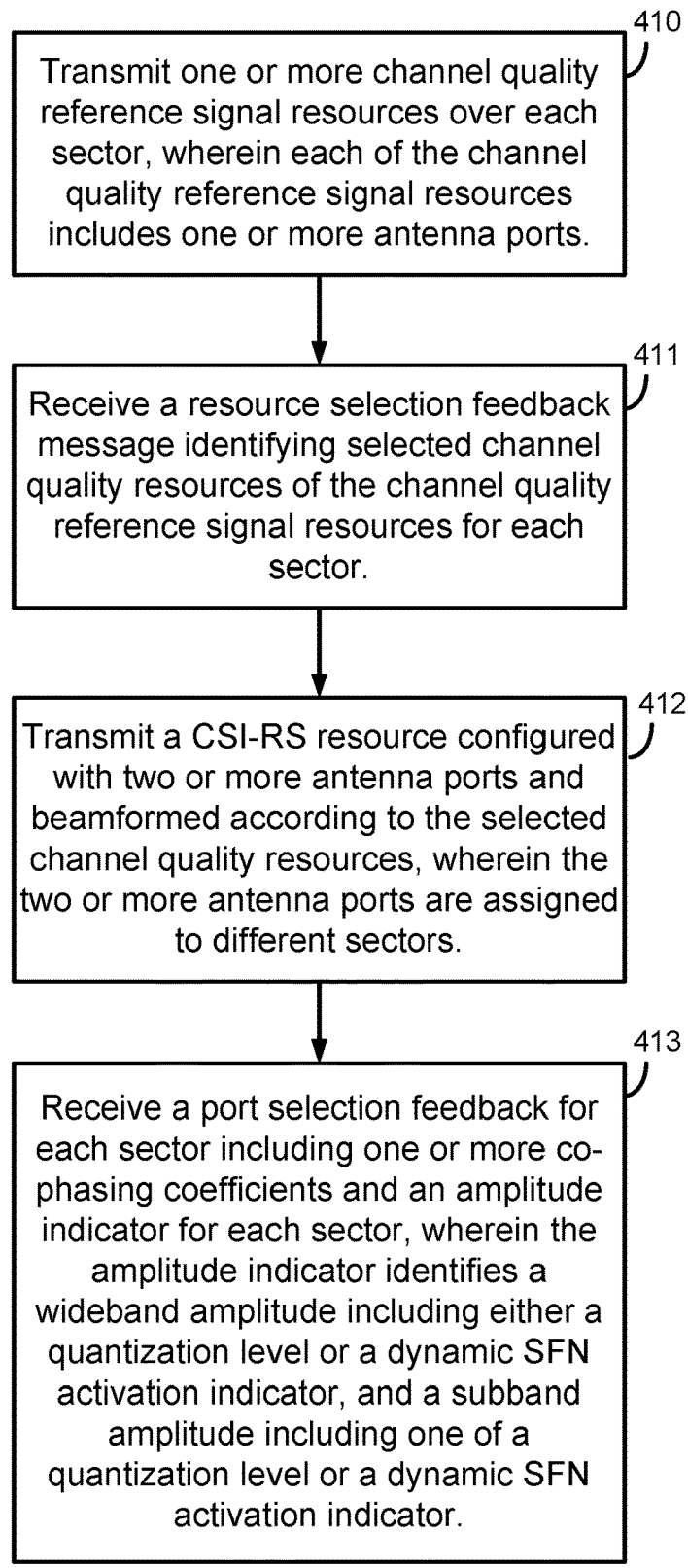
Figure 7:
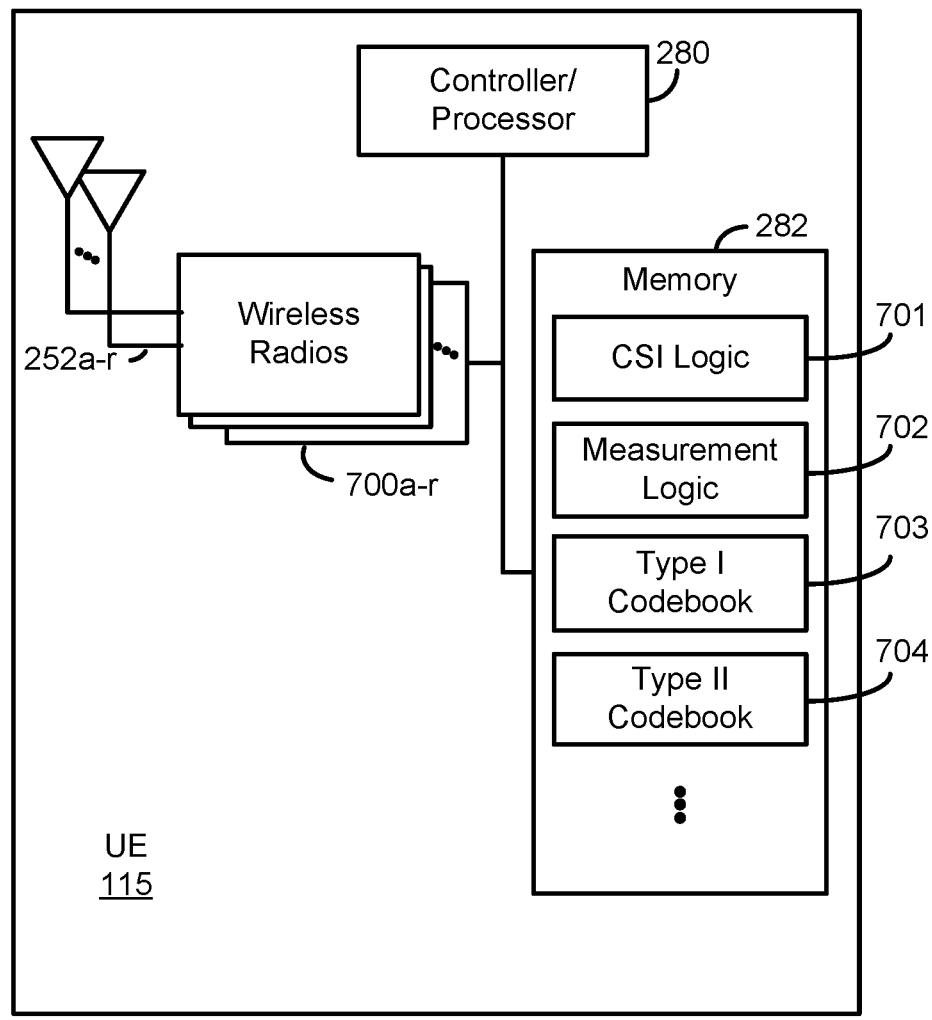
FIG. 7 is a block diagram illustrating a UE configured according to one aspect of the present disclosure.

FIGS. 4A and 4B are block diagrams illustrating example blocks executed to implement one aspect of the present disclosure. The example blocks will also be described with respect to UE 115 as illustrated in FIGS. 2 and 7. FIG. 7 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 700*a-r* and antennas 252*a-r*. Wireless radios 700*a-r* includes various components and hardware, as illustrated in FIG. 2 for UE 115, including modulator/demodulators 254*a-r*, MIMO detector 256, receive processor 258, transmit processor 264, and TX MIMO processor 266.

Figure 8:
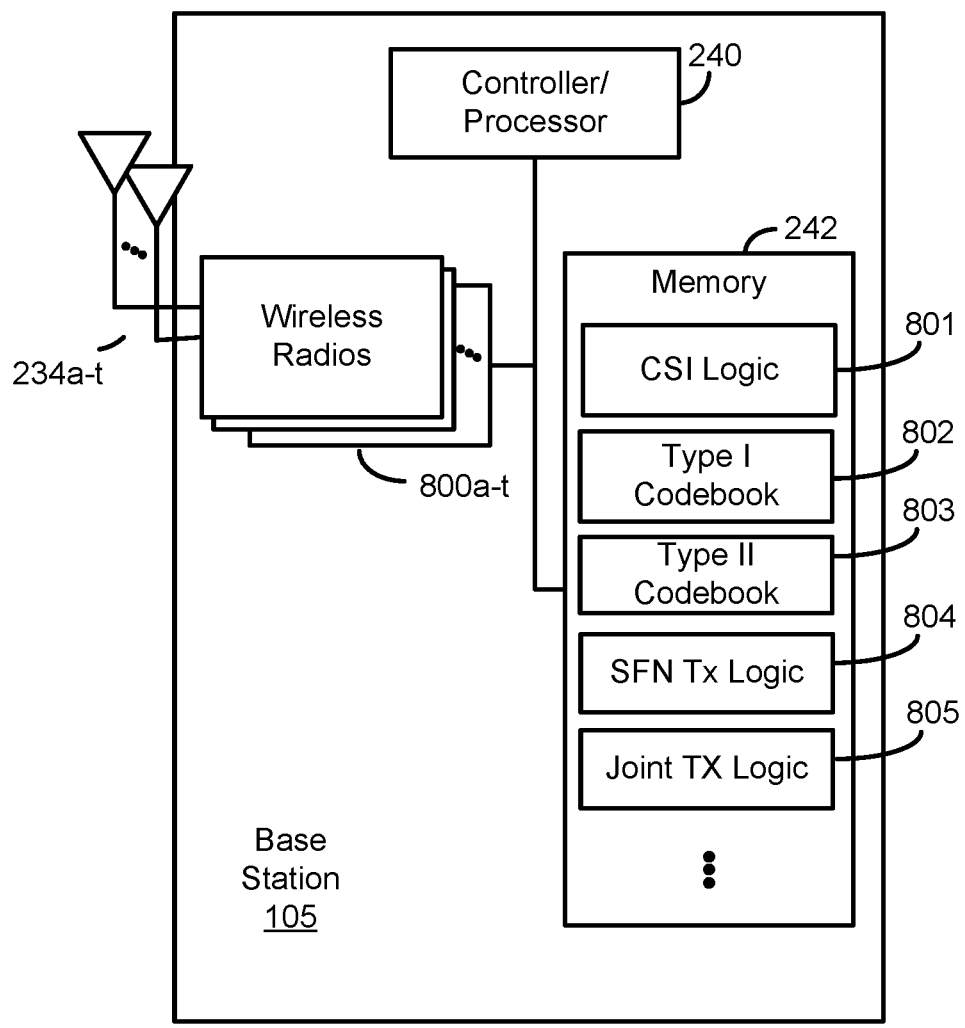
FIG. 8 is a block diagram illustrating a base station configured according to one aspect of the present disclosure.

The example blocks will also be described with respect to base station 105 as illustrated in FIGS. 2 and 8. FIG. 8 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 800*a-t* and antennas 234*a-t*. Wireless radios 800*a-t* includes various components and hardware, as illustrated in FIG. 2 for base station 105, including modulator/demodulators 232*a-t*, MIMO detector 236, receive processor 238, transmit processor 220, and TX MIMO processor 230.

At block 410, a base station transmits, and, at block 401, a UE receives one or more channel quality reference signal resources from a serving base station over each sector within a receive area of the UE, wherein each of the one or more channel quality reference signal resources includes one or more antenna ports. A base station, such as base station 105, may use antennas 234*a-t* to operate communications in multiple sectors, wherein each sector shares the same PCID. In order to control CSI feedback from a served UE, such as UE 115, base station 105, under control of controller/processor 240, executes CSI logic 801, stored in memory. The actions and functionality enabled via execution of the steps and instructions of CSI logic 801 (referred to here as the "execution environment" of CSI logic 801) provide for base station 105 to configure UE 115 with channel quality reference signal resources (e.g., CSI-RS, SSB, or the like) which UE 115 may use to monitor for and measure such reference signals transmitted by base station 105. Base station 105 configures such channel quality reference signal resources for each sector managed by base station 105.

UE 115, under control of controller/processor 280, executes CSI logic 701, stored in memory 282. Within the execution environment of CSI logic 701, UE 115 monitors for CSI configuration information transmitted from a serving base station, such as base station 105. When UE 115 receives the CSI configuration information, it will monitor for the channel quality reference signals from base station 105.

At block 401, the UE reports and, at block 411, the base station receives a resource selection feedback message to the serving base station, wherein the resource selection feedback message identifies selected channel quality resources of the one or more channel quality reference signal resources for each sector. UE 115, under control of controller/processor 280, executes measurement logic 702, stored in memory 282. The execution environment of measurement logic 702 provides UE 115 with the functionality to identify a most favorable resource of the CSI-RS resources provided by base station 105. In FR1, the execution environments of measurement logic 702 and CSI logic 701 provide for UE 115 to select a precoder from Type I codebook 703, in memory 282. The selected precoder identifies the selected CSI-RS resource. In FR2, the execution environments of measurement logic 702 and CSI logic 701 provide for UE 115 to select the CSI-RS resource indicator (CRI) that identifies the selected beam of the multiple beams for the configured CSI-RS resources. The precoder from Type I codebook 703, in FR1 operations, and CRI, in FR2 operations, provide resource selection feedback for UE 115. Within the execution environment of CSI logic 701, UE 115 generates a CSI report that includes the resource selection feedback and transmits the CSI report to base station 105 via wireless radios 700*a-r* and antennas 252*a-r*.

Base station 105 receives the CSI report from UE 115 via antennas 234*a-t* and wireless radios 800*a-t*. Base station 105 uses the resource selection feedback within the execution environment of CSI logic 801 to enable the two-step CSI procedure. Base station 105, enabled with the functionality provided by the execution environment of CSI logic 801, configures a CSI-RS resource configured with two or more antenna ports based on the resource selection feedback.

At block 412, the base station transmits and, at block 402, the UE receives a CSI-RS resource configured with two or more antenna ports and beamformed according to the selected channel quality resources identified in the resource selection feedback message, wherein one of the two or more antenna ports is assigned to one of the sectors within the receive area and at least one other of the antenna ports is assigned to another of the sectors within the receive area. Base station 105 transmits the CSI-RS resource configured with the two or more antenna ports beamformed according to the beam selected via the resource selection feedback. This CSI-RS resource configuration is transmitted to UE 115 via wireless radios 800*a-t* and antennas 234*a-t*.

UE 115 receives the CSI-RS resource configuration via antennas 252*a-r* and wireless radios 700*a-r*. Within the execution environment of CSI logic 701, UE 115 determines the CSI-RS resource configured with the two or more antenna ports and monitors for the CSI-RS from base station 105. Upon detection, within the execution environment of measurement logic 702, UE 115 measures the quality of the detected CSI-RS.

At block 403, the UE reports and, at block 413, the base station receives a port selection feedback for each sector including one or more co-phasing coefficients and an amplitude indicator for each sector, wherein the amplitude indicator identifies a wideband amplitude including one of a wideband quantization level or a wideband dynamic SFN activation indicator, and a subband amplitude including one of a subband quantization level or a subband dynamic SFN activation indicator. UE 115, within the execution environment of CSI logic 701 uses the results of the measurements of the CSI-RS resource to select port selection feedback from Type-II codebook 704, stored in memory 282. According to the aspects of the present disclosure, the port selection feedback includes the one or more co-phasing coefficients and the amplitude indicator for each sector, in which the amplitude indicator includes additional bits for the subband amplitude. The additional bits allow for UE 115 to dynamically trigger activation/deactivation of subband SFN transmissions.

Base station 105 receives the port selection feedback from UE 115 via antennas 234*a-t* and wireless radios 800*a-t*. Within the execution environment of CSI logic 801, base station 105 identifies the signaled port selection feedback from Type-II codebook 803, in memory 282. Base station 105 may then determine the co-phasing and amplitude indicators for each sector provided by UE 115, including whether the wideband and subband amplitude identifies activation/deactivation of wideband/subband SFN transmissions. When either or both of the wideband and subband amplitude identifies a quantization level, base station 105 will provide transmission of the data according to execution of joint transmission logic 805, in memory 242. The execution environment of joint transmission logic 805 provides for base station 105 to jointly transmit over both sectors. When either or both of the wideband and subband amplitude identifies the wideband/subband SFN activation/deactivation, base station 105 will either activate or deactivate SFN transmission according to execution of SFN transmission logic 804, in memory 242. The execution environment of SFN transmission logic 804 provides for base station 105 to either activate or deactivate SFN transmission in the corresponding sector(s).

Figure 5:
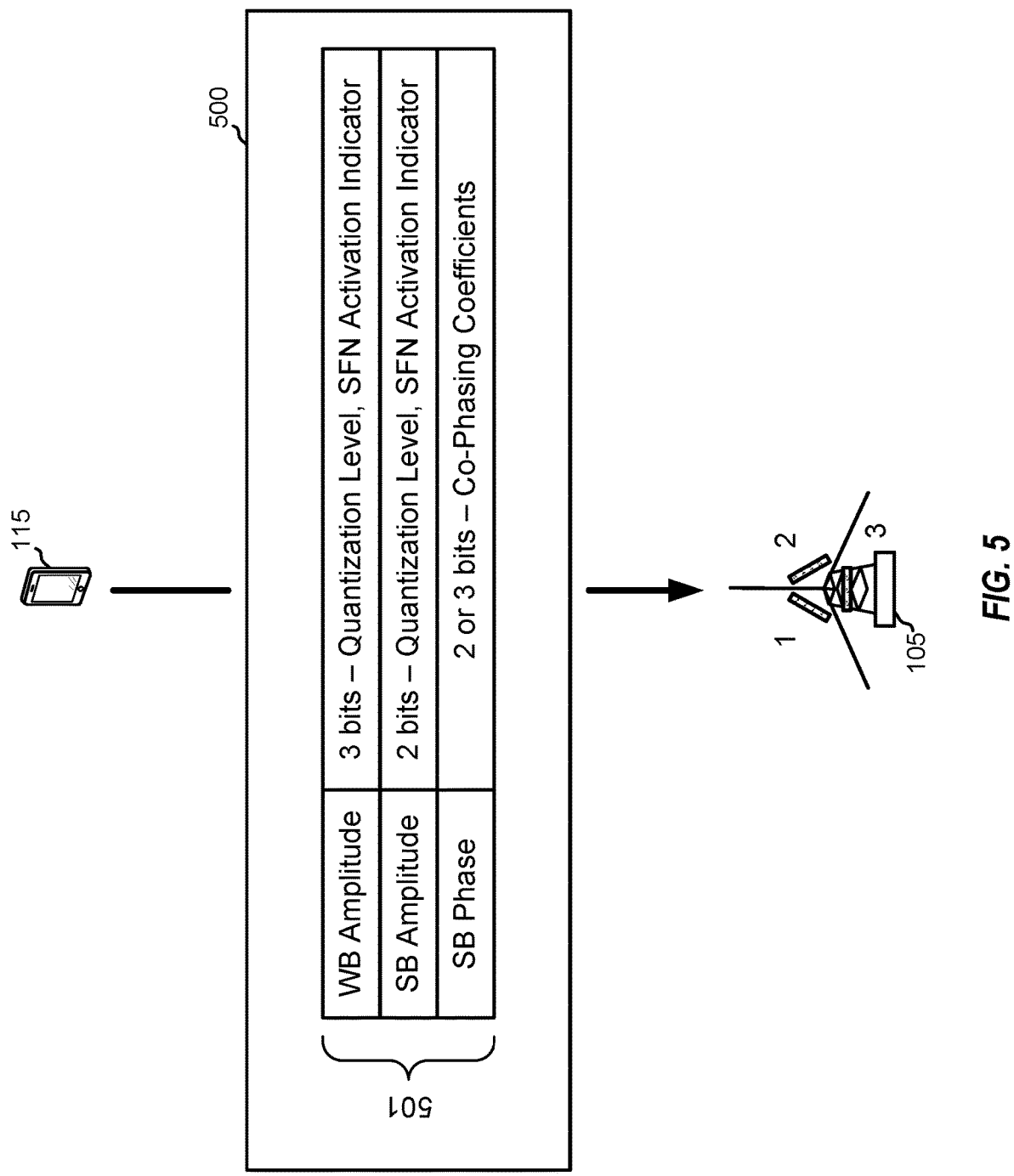
FIG. 5 is a block diagram illustrating communications between a base station and a UE in a two-step CSI procedure configured according to one aspect of the present disclosure.

FIG. 5 is a block diagram illustrating communications between a base station 105 and a UE 115 in a two-step CSI procedure configured according to one aspect of the present disclosure. According to the illustrated aspect of the present disclosure, CSI report 500, which represents the step 2 CSI report transmitted by UE 115, includes additional bits available for the precoder, $w_{k,r,l}$, in port selection information 501. The precoder within port selection information 501 includes the wideband amplitude information, $p_{r,l,i}^{WB}$, the subband amplitude information, $p_{k,r,l,i}^{SB}$ and the subband phase information $\varphi_{k,r,l,i}^{SB}$. The additional bits provide the capability to hold additional subband amplitude information. The amplitude information, according to the aspects of the present disclosure, may include not only the wideband and subband amplitude quantization level values, but also wideband and subband dynamic SFN activation indicators. As noted above, in the legacy two-step CSI procedure, the subband amplitude information, $p_{k,r,l,i}^{SB}$, included 1-bit for quantization level without any control of subband SFN operations. The subband amplitude information, $p_{k,r,l,i}^{SB}$, according to the aspects of the present disclosure include at least an additional bit for an activation/deactivation of SFN operations at the subband level. By provided the additional capability to activate/deactivate SFN operations on the wideband and subband levels, the communications between base station 105 and UE 115 may be provided more efficiently.

In one example implementation, port selection information 501 provides 3-bits for wideband amplitude information, $p_{r,l,i}^{WB}$, to either select one of the quantization levels (e.g., 1, $\sqrt{0.5}$, $\sqrt{0.25}$, $\sqrt{0.125}$, $\sqrt{0.0625}$, $\sqrt{0.0313}$, $\sqrt{0.0156}$) or provide the wideband dynamic SFN activation indicator (e.g., represented by a '0' entry). Port selection information 501 provides at least 2-bits for subband amplitude information, $p_{k,r,l,i}^{SB}$, to either select one of the quantization levels (e.g., 1, $\sqrt{0.5}$) or provide the subband dynamic SFN activation indicator (e.g., represented by a '0' entry). Port selection information 501 also includes subband phase information $\varphi_{k,r,l,i}^{SB}$, that provides 2-bits or 3-bits to select the co-phasing coefficients $$\left(\text{e.g., } 2-\text{bits}: e^{j\frac{\pi n}{2}}, n = 0, 1, 2, 3 \text{ or } 3-\text{bits } e^{j\frac{\pi n}{4}}, n = 0, 1, \ldots, 7\right).$$

Figure 6:
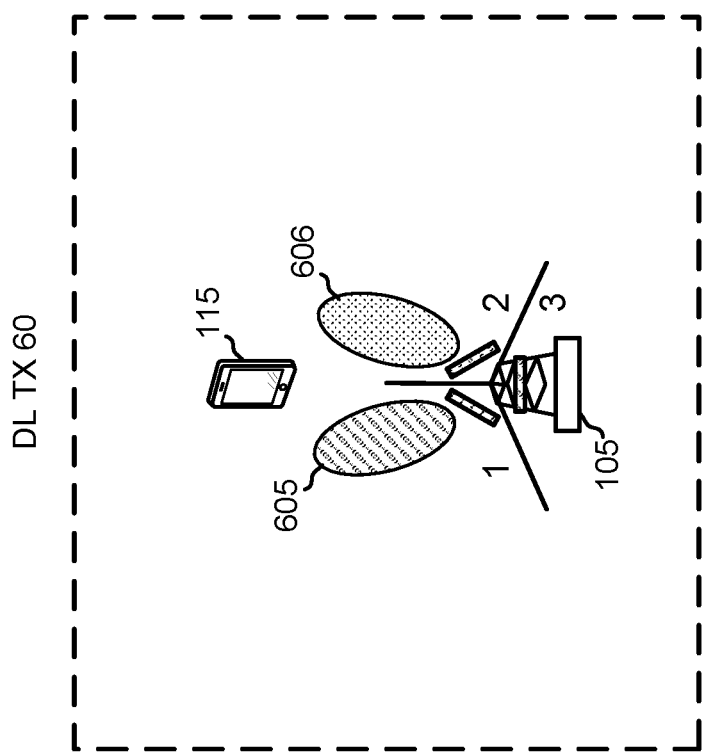
FIG. 6 is a block diagram illustrating a two-step CSI procedure configured according to one aspect of the present disclosure.
Figure 6:
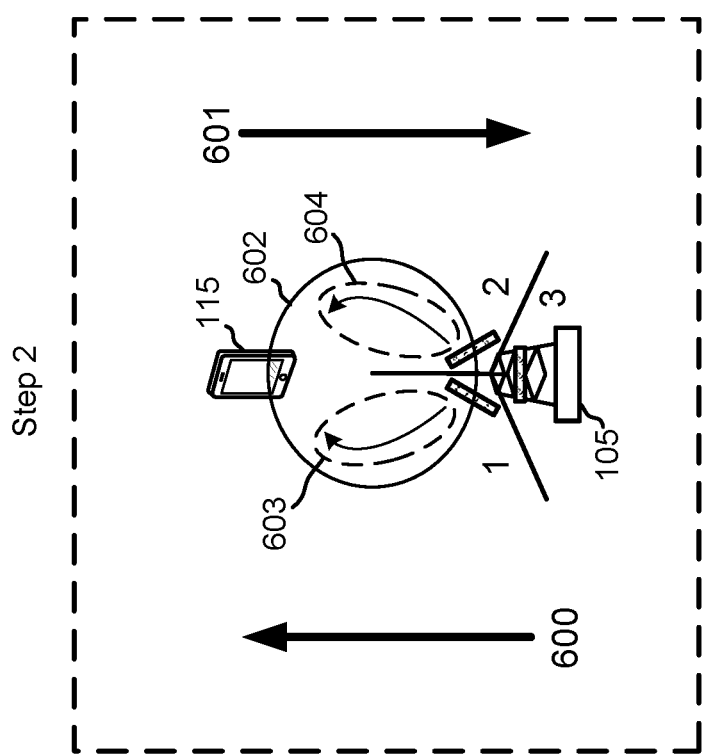

FIG. 6 is a block diagram illustrating a two-step CSI procedure configured according to one aspect of the present disclosure. After the beam selection information is provided by UE 115 in the first step of the two-step CSI procedure (not shown), base station 105 transmits configuration 600, which includes one CSI-RS resource 602, having two beamformed CSI-RS ports 603-604 for both of sectors 1 and 2. UE 115 observes CSI-RS resource 602 to determine the Type-II port selection codebook precoder, $w_{k,r,l}$. UE 115 generates CSI report 601 that includes the port selection information including the selected Type-II codebook precoder. With the additional bit available for the subband amplitude information, $p_{k,r,l,i}^{SB}$, base station 105 may then determine whether to activate or deactivate both wideband and subband SFN for downlink transmission 60 (e.g., PDCCH, PDSCH, etc.) over sectors 1 and 2. As illustrated, The Type-II precoder, $w_{k,r,l}$, includes dynamic SFN activation indicators for both the wideband amplitude information, $p_{r,l,i}^{WB}$, and the subband amplitude information $p_{k,r,l,i}^{SB}$. The wideband and subband dynamic SFN activation indicators provide for base station 105 to send downlink transmission 60 using wideband/subband SFN transmission 605 in sector 1 and wideband/subband SFN transmission 606 in sector 2.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 4A and 4B may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various aspects of the present disclosure may be implemented in many different ways, including methods, processes, non-transitory computer-readable medium having program code recorded thereon, apparatus having one or more processors with configurations and instructions for performing the described features and functionality, and the like. A first aspect of wireless communication may include receiving, at a UE, one or more channel quality reference signal resources from a serving base station over each sector within a receive area of the UE, wherein each of the one or more channel quality reference signal resources includes one or more antenna ports; reporting, by the UE, a resource selection feedback message to the serving base station, wherein the resource selection feedback message identifies selected channel quality resources of the one or more channel quality reference signal resources for each sector; receiving, at the UE, a CSI-RS resource configured with two or more antenna ports and beamformed according to the selected channel quality resources identified in the resource selection feedback message, wherein one of the two or more antenna ports is assigned to one of the each sector within the receive area and another of the two or more antenna ports is assigned to another of the each sector within the receive area; and reporting, by the UE, a port selection feedback for each sector including one or more co-phasing coefficients and an amplitude indicator for each sector, wherein the amplitude indicator identifies a wideband amplitude including one of a wideband quantization level or a wideband dynamic SFN activation indicator, and a subband amplitude including one of a subband quantization level or a subband dynamic SFN activation indicator.

A second aspect, based on the first aspect, wherein the one or more channel quality reference signal resources includes one of: a CSI-RS resource configuration for communications within a first band of FR1; or one of: one or more CSI-RS resource configurations or one or more SSBs for communications within a second band of FR2.

A third aspect, based on the second aspect, wherein the resource selection feedback message includes one of: a Type-1 single panel codebook CSI feedback message for communications within the first band of FR1, or one of a CRI or SSB index for communications within the second band of FR2, wherein the CRI identifies a CSI-RS resource of the one or more CSI-RS resource configurations and the SSB index identifies an SSB of the one or more SSBs.

A fourth aspect includes any combination of the first aspect through the third aspect.

A fifth aspect of wireless communication includes transmitting, at a base station, one or more channel quality reference signal resources to a served UE over each sector within a receive area of the served UE, wherein each of the one or more channel quality reference signal resources includes one or more antenna ports; receiving, by the base station, a resource selection feedback message from the served UE, wherein the resource selection feedback message identifies selected channel quality resources of the one or more channel quality reference signal resources for each sector; transmitting, at the base station, a CSI-RS resource configured with two or more antenna ports and beamformed according to the selected channel quality resources identified in the resource selection feedback message, wherein one of the two or more antenna ports is assigned to one of the each sector within the receive area and another of the two or more antenna ports is assigned to another of the each sector within the receive area; and receiving, by the base station, a port selection feedback for each sector including one or more co-phasing coefficients and an amplitude indicator for each sector, wherein the amplitude indicator identifies a wideband amplitude including one of a wideband quantization level or a wideband dynamic SFN activation indicator, and a subband amplitude including one of a subband quantization level or a subband dynamic SFN activation indicator.

A sixth aspect, based on the fifth aspect, wherein the one or more channel quality reference signal resources includes one of: a CSI-RS resource configuration for communications within a first band of FR1; or one of: one or more CSI-RS resource configurations or one or more SSBs for communications within a second band of FR2.

A seventh aspect, based on the sixth aspect, wherein the resource selection feedback message includes one of: a Type-1 single panel codebook CSI feedback message for communications within the first band of FR1, or one of a CRI or SSB index for communications within the second band of FR2, wherein the CRI identifies a CSI-RS resource of the one or more CSI-RS resource configurations and the SSB index identifies an SSB of the one or more SSBs.

An eighth aspect, based on the fifth aspect, further including: determining, by the base station, to deactivate subband SFN transmissions in a sector in response to the subband dynamic SFN activation indicator associated with the sector indicating a deactivation of the subband SFN transmissions; and determining, by the base station, to activate subband SFN transmissions in the sector in response to the subband dynamic SFN activation indicator associated with the sector indicating an activation of the subband SFN transmissions.

A ninth aspect includes any combination of the fifth aspect through the eighth aspect.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication performed at a user equipment (UE), the method comprising:
    receiving one or more channel quality reference signal resources from a serving base station over each sector of a plurality of sectors within a receive area of the UE, wherein each of the one or more channel quality reference signal resources indicates one or more antenna ports;
    receiving a channel state information-reference signal (CSI-RS) resource configured with two or more antenna ports and beamformed according to the channel quality reference signal resources identified in a resource selection feedback message reported to the serving base station, wherein a first antenna port of the two or more antenna ports is assigned to a first sector of the plurality of sectors within the receive area and a second antenna port of the two or more antenna ports is assigned to a second sector of the plurality of sectors within the receive area; and
    reporting a port selection feedback for each sector including one or more co-phasing coefficients and an amplitude indicator for each sector, wherein the amplitude indicator identifies:
    a wideband dynamic single frequency network (SFN) activation indicator and
    a subband dynamic SFN activation indicator.

2. The method of claim 1, wherein the one or more channel quality reference signal resources include one or more synchronization signal blocks (SSBs) for communications within a second band of frequency range two (FR2).

3. The method of claim 2, wherein the resource selection feedback message includes one of:
    a Type-1 single panel codebook CSI feedback message for communications within a first band of frequency range one (FR1), or
    a SSB index for communications within the second band of FR2, wherein the SSB index identifies a SSB of the one or more SSBs.

4. A method of wireless communication performed by a base station, the method comprising:
    transmitting one or more channel quality reference signal resources to a served user equipment (UE) over each sector of a plurality of sectors within a receive area of the served UE, wherein each of the one or more channel quality reference signal resources indicates one or more antenna ports;
    transmitting a channel state information-reference signal (CSI-RS) resource configured with two or more antenna ports and beamformed according to the channel quality reference signal resources identified in a resource selection feedback message reported to the served UE, wherein a first antenna port of the two or more antenna ports is assigned to a first sector of the plurality of sectors within the receive area and a second antenna port of the two or more antenna ports is assigned to a second sector of the plurality of sectors within the receive area; and
    receiving a port selection feedback for each sector including one or more co-phasing coefficients and an amplitude indicator for each sector, wherein the amplitude indicator identifies:
    a wideband dynamic single frequency network (SFN) activation indicator and
    a subband dynamic SFN activation indicator.

5. The method of claim 4, wherein the one or more channel quality reference signal resources includes one of:
    a CSI-RS resource configuration for communications within a first band of frequency range one (FR1); or
    one of: one or more CSI-RS resource configurations or one or more synchronization signal blocks (SSBs) for communications within a second band of frequency range two (FR2).

6. The method of claim 5, wherein the resource selection feedback message includes one of:
    a Type-1 single panel codebook CSI feedback message for communications within the first band of FR1, or
    one of a CSI-RS resource indicator (CRI) or a SSB index for communications within the second band of FR2, wherein the CRI identifies a CSI-RS resource of the one or more CSI-RS resource configurations and the SSB index identifies a SSB of the one or more SSBs.

7. The method of claim 4, further including:
deactivating subband SFN transmissions in a sector in response to a subband dynamic SFN activation indicator associated with the sector indicating a deactivation of the subband SFN transmissions; or
activating subband SFN transmissions in the sector in response to the subband dynamic SFN activation indicator associated with the sector indicating an activation of the subband SFN transmissions.

8. An apparatus configured for wireless communication, the apparatus comprising:
at least one processor; and
a memory comprising instructions,
wherein the at least one processor is configured to execute the instructions and cause the apparatus to:
receive one or more channel quality reference signal resources from a serving base station over each sector of a plurality of sectors within a receive area of a UE, wherein each of the one or more channel quality reference signal resources indicates one or more antenna ports;
receive a channel state information-reference signal (CSI-RS) resource configured with two or more antenna ports and beamformed according to the channel quality reference signal resources identified in a resource selection feedback message reported to the serving base station, wherein a first antenna port of the two or more antenna ports is assigned to a first sector of the plurality of sectors within the receive area and a second antenna port of the two or more antenna ports is assigned to a second sector of the plurality of sectors within the receive area; and
report a port selection feedback for each sector including one or more co-phasing coefficients and an amplitude indicator for each sector, wherein the amplitude indicator identifies:
a wideband dynamic single frequency network (SFN) activation indicator and
a subband dynamic SFN activation indicator.

9. The apparatus of claim 8, wherein the one or more channel quality reference signal resources includes one or more synchronization signal blocks (SSBs) for communications within a second band of frequency range two (FR2).

10. The apparatus of claim 9, wherein the resource selection feedback message includes one of:
a Type-1 single panel codebook CSI feedback message for communications within a first band of frequency range one (FR1), or
a SSB index for communications within the second band of FR2, wherein the SSB index identifies a SSB of the one or more SSBs.

11. An apparatus configured for wireless communication, the apparatus comprising:
at least one processor; and
a memory comprising instructions,
wherein the at least one processor is configured to execute the instructions and cause the apparatus to:
initiate transmission of one or more channel quality reference signal resources to a served user equipment (UE) over each sector of a plurality of sectors within a receive area of the served UE, wherein each of the one or more channel quality reference signal resources indicates one or more antenna ports;
initiate transmission of a channel state information-reference signal (CSI-RS) resource configured with two or more antenna ports and beamformed according to the channel quality reference signal resources identified in a resource selection feedback message reported to the serving UE, wherein a first antenna port of the two or more antenna ports is assigned to a first sector of the plurality of sectors within the receive area and a second antenna port of the two or more antenna ports is assigned to a second sector of the plurality of sectors within the receive area; and
receive a port selection feedback for each sector including one or more co-phasing coefficients and an amplitude indicator for each sector, wherein the amplitude indicator identifies:
a wideband dynamic single frequency network (SFN) activation indicator and
a subband dynamic SFN activation indicator.

12. The apparatus of claim 11, wherein the one or more channel quality reference signal resources includes one of:
a CSI-RS resource configuration for communications within a first band of frequency range one (FR1); or
one of: one or more CSI-RS resource configurations or one or more synchronization signal blocks (SSBs) for communications within a second band of frequency range two (FR2).

13. The apparatus of claim 12, wherein the resource selection feedback message includes one of:
a Type-1 single panel codebook CSI feedback message for communications within the first band of FR1, or
one of a CSI-RS resource indicator (CRI) or a SSB index for communications within the second band of FR2, wherein the CRI identifies a CSI-RS resource of the one or more CSI-RS resource configurations and the SSB index identifies a SSB of the one or more SSBs.

14. The apparatus of claim 11, further including configuration of the at least one processor to:
deactivate subband SFN transmissions in a sector in response to a subband dynamic SFN activation indicator associated with the sector indicating a deactivation of the subband SFN transmissions; or
activate subband SFN transmissions in the sector in response to the subband dynamic SFN activation indicator associated with the sector indicating an activation of the subband SFN transmissions.

15. The method of claim 1, wherein the wideband dynamic single frequency network (SFN) activation indicator is configured to indicate, to the serving base station, to activate or deactivate wideband SFN transmissions in a sector corresponding to the wideband dynamic SFN activation indicator.

16. The method of claim 15, wherein the subband dynamic SFN activation indicator is configured to indicate, to the serving base station, to activate or deactivate subband SFN transmissions in a sector corresponding to the subband dynamic SFN activation indicator.

17. The method of claim 4, further comprising:
deactivating subband SFN transmissions in a sector based on the subband dynamic SFN activation indicator.

18. The method of claim 4, further comprising:
activating subband SFN transmissions in a sector in response to the subband dynamic SFN activation indicator.

19. The apparatus of claim 8, wherein the at least one processor is further configured to execute the instructions to cause the apparatus to:

report the resource selection feedback message to the serving base station, wherein the resource selection feedback message identifies a channel quality reference signal resource of the one or more channel quality reference signal resources for each sector.

20. The apparatus of claim 8, further comprising:
a transceiver via which the one or more channel quality reference signal resources and the CSI-RS resource are received, wherein the apparatus is configured as a UE.

21. The apparatus of claim 11, wherein the at least one processor is further configured to execute the instructions and cause the apparatus to:
receive the resource selection feedback message from the served UE, wherein the resource selection feedback message identifies a channel quality reference signal resource of the one or more channel quality reference signal resources for each sector.

22. The apparatus of claim 11, further comprising:
a transceiver configured to transmit the one or more channel quality reference signal resources, transmit the CSI-RS resource, and receive the port selection feedback, wherein the apparatus is configured as a base station.

23. The method of claim 7, wherein the deactivation of the subband SFN transmissions comprises setting at least one bit of the subband dynamic SFN activation indicator to identify a quantization level associated with a zero amplitude.

* * * * *